United States Patent
Hollis (10) Patent No.: US 7,847,504 B2
(45) Date of Patent: Dec. 7, 2010

(54) DYNAMIC BALANCING MOBILE ROBOT

(75) Inventor: Ralph L. Hollis, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 499 days.

(21) Appl. No.: 11/973,685

(22) Filed: Oct. 10, 2007

(65) Prior Publication Data

US 2008/0084175 A1    Apr. 10, 2008

Related U.S. Application Data

(60) Provisional application No. 60/850,601, filed on Oct. 10, 2006.

(51) Int. Cl.
*B25J 5/00* (2006.01)
(52) U.S. Cl. .............. 318/568.12; 318/568.11
(58) Field of Classification Search ............ 318/568.12, 318/568.11; 901/1; 180/252
See application file for complete search history.

(56) References Cited

U.S. PATENT DOCUMENTS

| | | | |
|---|---|---|---|
| 5,952,796 A * | 9/1999 | Colgate et al. ............. 318/1 |
| 6,289,263 B1 | 9/2001 | Mukherjee | |
| 6,561,294 B1 | 5/2003 | Kamen et al. | |
| 6,571,892 B2 | 6/2003 | Kamen et al. | |
| 6,581,714 B1 | 6/2003 | Field et al. | |
| 6,651,766 B2 | 11/2003 | Kamen et al. | |
| 6,779,621 B2 | 8/2004 | Kamen et al. | |
| 6,792,335 B2 * | 9/2004 | Ross et al. ............... 700/245 |
| 6,796,396 B2 | 9/2004 | Kamen et al. | |
| 6,799,649 B2 | 10/2004 | Kamen et al. | |
| 6,866,107 B2 * | 3/2005 | Heinzmann et al. ......... 180/7.1 |
| 6,896,078 B2 * | 5/2005 | Wakui ........................ 180/7.1 |
| 6,915,878 B2 * | 7/2005 | Kamen et al. .............. 182/141 |
| 6,929,080 B2 | 8/2005 | Kamen et al. | |
| 6,969,079 B2 | 11/2005 | Kamen et al. | |
| 7,004,271 B1 | 2/2006 | Kamen et al. | |
| 7,090,040 B2 | 8/2006 | Kamen et al. | |
| 7,174,976 B2 | 2/2007 | Kamen et al. | |
| 7,210,544 B2 | 5/2007 | Kamen et al. | |
| 7,258,591 B2 * | 8/2007 | Xu et al. .................... 446/273 |
| 7,363,993 B2 * | 4/2008 | Ishii .......................... 180/7.1 |
| 7,400,108 B2 * | 7/2008 | Minor et al. ........... 318/568.12 |
| 2006/0243497 A1 | 11/2006 | Orenbuch | |

OTHER PUBLICATIONS

Laszlo Havasi, "ERROSphere: an Equilibrator Robot," International Conference on Control and Automation, 2005, pp. 971-976.
Tatsuro Endo and Yoshihiko Nakamura, "An Omnidirectional Vehicle on a Basketball," University of Tokyo, Japan, 2005.

* cited by examiner

*Primary Examiner*—Walter Benson
*Assistant Examiner*—Antony M Paul
(74) *Attorney, Agent, or Firm*—Jones Day (57) ABSTRACT

A mobile robot having a height-to-width ratio approximating a normal adult human balances and maneuvers atop a single, spherical wheel. Dynamic balancing techniques incorporating fiber-optic gyroscopes and micro-electromechanical accelerometers measure a number of parameters which, along with data from motor shaft encoders, enable a computer to calculate the forces needed to be applied to the spherical wheel to maintain the robot upright as it maneuvers or remains in place.

26 Claims, 7 Drawing Sheets

DYNAMIC BALANCING MOBILE ROBOT

CROSS REFERENCE TO RELATED APPLICATIONS

The present application claims the benefit of U.S. Patent Application Ser. No. 60/850,601 filed Oct. 10, 2006, and entitled Dynamically-Stable Spherical Mobile Robot, the entirety of which is hereby incorporated by reference for all purposes.

STATEMENT REGARDING FEDERALLY FUNDED RESEARCH

This invention was made with government support under National Science Foundation Grant Nos. IIS0308067 and IIS0535183. The government may have certain rights in this invention.

BACKGROUND

Robots may be thought of in a variety of different ways. For purposes of this disclosure, it is useful to think of mobile robots as being statically stable, e.g., stable when un-powered, and dynamically stable, e.g., stable only when powered. Statically stable robots generally have at least three wheels. A significant but frequently overlooked problem is that statically stable wheeled mobile robots can easily become unstable. If the center of gravity is too high, or the robot accelerates/decelerates too rapidly, or is on a sloping surface, or is pushed too hard, the robot can tip over. Thus, statically stable wheeled robots tend to have low centers of gravity and large bases. However, short, wheeled robots having large bases do not interact well with humans and have trouble maneuvering in environments which are crowded or cluttered.

Work on dynamically stable wheeled robots has focused on two-wheeled devices. A two-wheeled robot with inverse pendulum control developed in Japan was demonstrated in 1994. (Y. S. Ha and S. Yuta., "Trajectory tracking control for navigation of self-contained mobile inverse pendulum," In *Proc. IEEE/RSJ Int'l. Conf. on Intelligent Robots and Systems*, pages 1875-1882, 1994). The two-wheeled design eliminated the need for a third castoring wheel. The same group introduced a one-wheel balancing robot. (R. Nakajima, T. Tsubouchi, S. Yuta, and E. Koyanagi, "A development of a new mechanism of an autonomous unicycle," In *Proc. IEEE/RSJ Int'l. Conf. on Intelligent Robots and Systems*, pages 906-12, Grenoble, France, Sep. 7-11, 1997). The wheel is a prolate ellipsoid like a rugby ball and is driven with an axle along the major axis. The body of the robot has a hinge above and perpendicular to this axis. The robot balances in the forward/backward directions by application of wheel torque in the manner of the two-wheeled design, and balances from side to side by leaning the body left or right at the actuated hinge. Recently, balancing wheelchairs and balancing 2-wheel Segway personal mobility devices have been introduced. The 2-wheel RMP robotic platforms based on the Segway are the subject of much recent development in robotic locomotion. (H. G. Nguyen, J. Morrell, K. Mullens, A. Burmeister, S. Miles, N. Farrington, K. Thomas, and D. Gage "Segway robotic mobility platform," In *SPIE Proc. 5609: Mobile Robots XVII*, Philadelphia, Pa., October 2004).

The previous rolling/balancing machines cannot immediately drive in a given direction without first re-orienting the drive mechanism. For example, a two-wheel balancing machine such as the Segway RMP cannot maneuver in tight spaces by moving sideways; a robot based on such a machine could not open and close a door without knowing the precise location of the hinges to establish the correct turning radius. The rugby-ball robot cannot turn in place but can only turn in a wide arc.

Other work involves robots which can overcome those problems by using a single spherical wheel. One example is described in Endo, et al., "An Omnidirectional Vehicle on a Basketball" 0-7803-9177-2/05 IEEE. In such devices, the user must provide input in the form of leaning in the direction of motion. The greater the amount of the lean, the faster the device will travel. Another example is described in Havase, "ERROShpere: an Equilibrator Robot," 0-7803-9137-3/05 IEEE. This robot, however, is believed to be capable of operation for only short periods of time before becoming unstable presumably due to imperfect sensing or and/or a faulty control method. In both of those cases, a single sphere is used as the contact between the device and the ground. In the case of the article by Endo, the device was a vehicle which could be ridden by a user. In the case of the article by Havase, the robot was constructed of a cage surrounding the sphere.

For certain tasks, a robot must be tall enough to interact with people at a reasonable height. Also, the robot must be skinny enough to easily make its way around without bumping into things or people. Thus, a need exists for a tall slender robot that is safe, agile, and can easily maneuver in cluttered and/or peopled environments and which can readily yield when pushed while remaining stable at all times.

SUMMARY

The mobile robot disclosed balances and maneuvers atop a single, spherical wheel. Dynamic balancing techniques incorporating fiber-optic gyroscopes and micro-electromechanical accelerometers measure the necessary parameters to enable a computer to calculate the rotational forces needed on the spherical wheel to maintain the robot upright as it maneuvers or remains motionless.

According to one embodiment, a dynamic balancing mobile robot comprises a single spherical wheel and a platform positioned above and resting on the wheel such that the single wheel is the sole contact point between the platform and the ground. Ground as used herein means the surface upon which the mobile robot is operating and includes indoor surfaces such as floors and the like as well as outdoor surfaces. The platform is configured such that the mobile robot has a height-to-width ratio approximating an average adult human. The platform carries a sensor, a motor, means for coupling a force generated by the motor to the wheel, and a control system that is responsive to the sensor for controlling the force provided by the motor to the wheel.

According to another embodiment, a dynamic balancing mobile robot is comprised of a single spherical wheel and a platform positioned above and resting on the wheel such that the single wheel is the sole contact point between the platform and the ground. The platform carries a plurality of motors, means for coupling forces generated by the motors to the wheel, a plurality of gyroscopic sensors and accelerometers for providing pitch, pitch rate, roll, and roll rate data, and a control system responsive to the plurality of sensors for generating signals for controlling the forces developed by the plurality of motors. The control system implements an inner control loop for controlling wheel velocity and an outer control loop for controlling stability of the robot system.

BRIEF DESCRIPTION OF THE DRAWINGS

For the present invention to be easily understood and readily practiced, the present invention will be described, for purposes of illustration and not limitation, in conjunction with the following figures wherein:

FIGS. 2A and 2B illustrate two views of a robot implementing the block diagram of FIG. 1; in FIG. 2A the legs are shown stowed; in FIG. 2B the legs are shown deployed;

DESCRIPTION

Figure 2A:
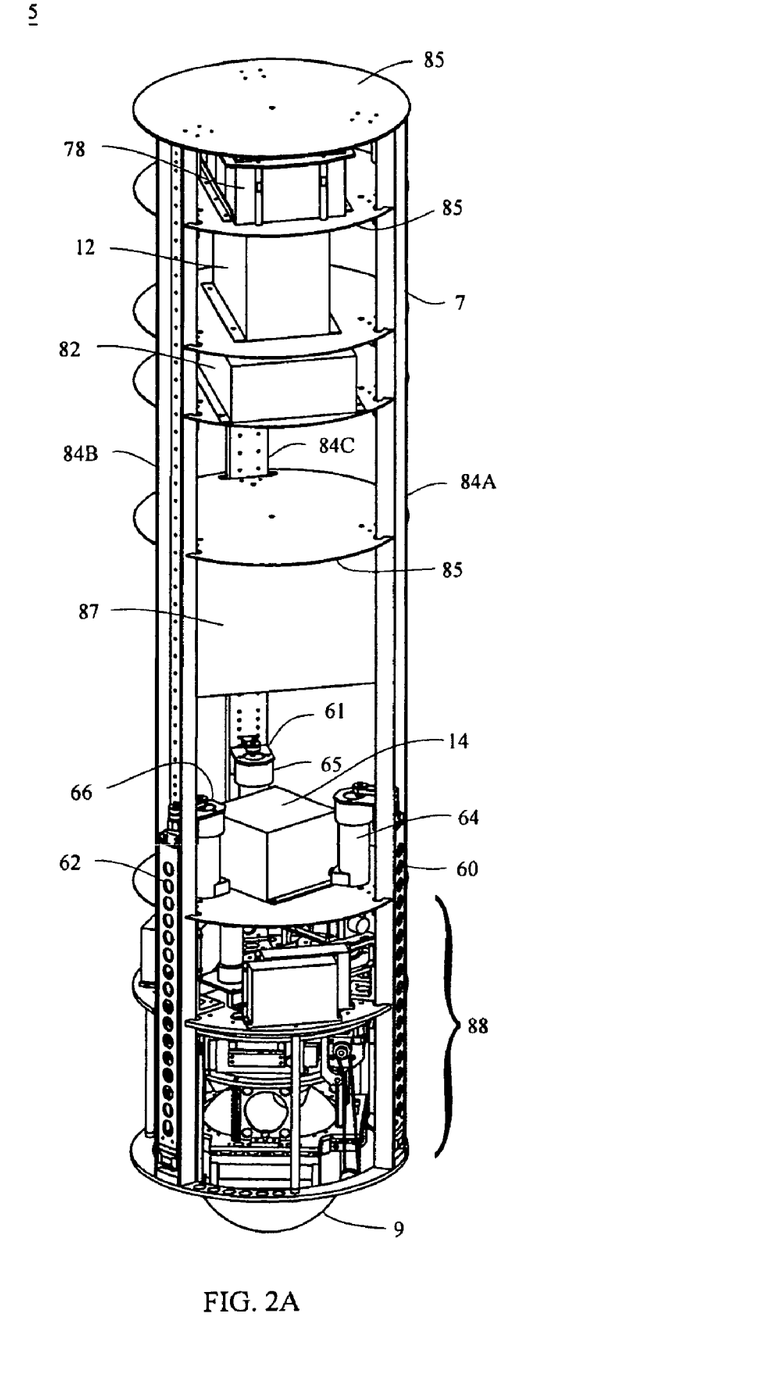

Turning briefly to FIG. 2A, a robot 5 constructed according to the teachings of the present disclosure is illustrated. The robot 5 is comprised of two major components, a platform 7 and a single spherical wheel 9. The platform 7 is positioned above the wheel 9 and rests on the wheel 9. The wheel 9 is the sole contact point between the platform 7 and the ground. The robot 5 was designed to demonstrate the feasibility of a mobile robot having dimensions that approximate those of a typical adult human and capable of dynamically balancing on the single spherical wheel 9.

Figure 1:
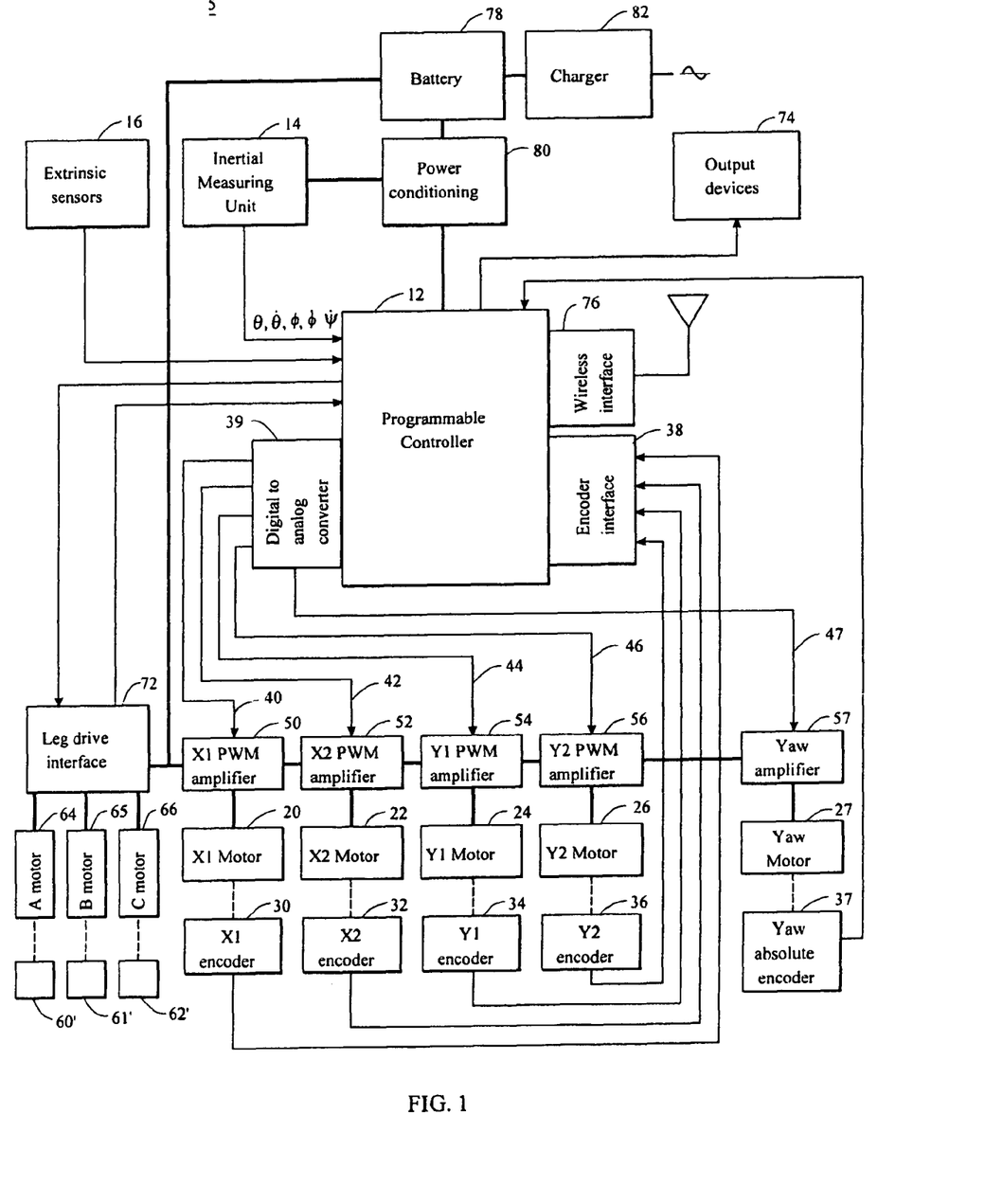
FIG. 1 is a high-level block diagram illustrating a robot constructed according to the teachings of the present disclosure.

Turning now to FIG. 1, that figure illustrates a high-level block diagram of the robot 5. The robot 5 has a programmable controller 12 which performs all of the calculations and issues the command signals necessary for proper operation of the robot 5. Although the control device is shown as programmable controller 12, other devices may be used as is known in the art.

The programmable controller 12 receives inputs from an inertial measuring unit 14 described more fully below. Inertial measuring unit 14 produces intrinsic data about the condition of the robot such as pitch angle and pitch rate ($\theta$, $\dot{\theta}$), roll angle and roll rate ($\phi$, $\dot{\phi}$) and yaw rate ($\dot{\psi}$) information. Pitch in the context of the robot 5 refers to leaning toward the front or back, roll refers to leaning toward the left or the right, and yaw refers to rotation about a vertical axis. That information is used in the programmable controller 12 as will be described below in connection with FIG. 4. The programmable controller 12 receives inputs from a plurality of extrinsic sensors 16. Extrinsic sensors 16 may take a variety of forms such as range finders, visions systems, heat sensors, etc. which produce data about the environment in which the robot is located.

Locomotion and stability for the robot 5 are provided by a plurality of motors. Two motors 20, 22 are provided for moving the robot 5 in the x direction, two motors 24, 26 are provided for moving the robot 5 in they direction, and one yaw motor 27 is provided for turning the platform of the robot 5. The reader will appreciate that because the robot 5 has a single spherical wheel 9 that provides the sole contact point between the robot 5 and ground, the robot 5 is omnidirectional. That is, the robot 5 does not need to turn or orient itself to move in a new direction.

Each of the motors is provided with an encoder. Specifically, motor 20 has an encoder 30, motor 22 has an encoder 32, motor 24 has an encoder 34, motor 26 has an encoder 36, and yaw motor 27 has an absolute yaw encoder 37. The outputs from the encoders 30, 32, 34, 36 are input to the programmable controller 12 through an encoder interface 38. The output of the absolute encoder 37 is input directly to the programmable controller 12.

The programmable controller 12 produces a plurality of control signals 40, 42, 44, 46, 47 which are output via a digital to analog converter 39. Each of the signals 40, 42, 44, 46, 47 may control, for example, a pulse width modulated amplifier 50, 52, 54, 56, 57 connected to the motors 20, 22, 24, 26, 27, respectively. Operation of the motor 20 in combination with the motor 22, and operation of the motor 24 in combination with the motor 26, imparts a torque to the spherical drive wheel 9 as will be explained in greater detail in conjunction with FIGS. 3A and 3B. Operation of the yaw motor 27 imparts a torque on the platform as will be explained in greater detail in conjunction with FIG. 3A.

The robot 5, because it is stable only when powered up and operational, must be provided with a means for keeping the robot 5 upright when the robot 5 is powered down. One means for providing stability when un-powered is through the use of legs 60, 61, 62 seen best in FIG. 2B. Each of the legs 60, 61, 62 may be moved from a stowed position (see FIG. 2A) in which the legs are stored parallel to a longitudinal axis of the robot 5, and a deployed position (see FIG. 2B) in which the legs form a tripod around the robot 5. Movement of the legs 60, 61, 62 is via motors 64, 65, 66 or other suitable means for moving such as hydraulics or the like. Limit switches, contact switches or the like 60', 61', 62' may be provided to indicate that a leg is in contact with the ground or fully stowed. The motors 64, 65, 66 or other means for moving are under the control of programmable controller 12 through a leg drive interface 72 such that the legs may be moved automatically from the stowed position to the deployed position, and vice versa.

The robot 5 is capable of automatically transitioning from a powered state in which the robot 5 dynamically balances itself and the legs 60, 61, 62 are stowed, to an un-powered state in which the legs 60, 61, 62 are deployed and the legs 60, 61, 62 are relied upon to balance the robot 5 and maintain the robot in an upright state (sometimes referred to as "landing"). The robot 5 is also capable of automatically transitioning from an un-powered state in which the legs 60, 61, 62 are deployed and are relied upon to balance the robot 5 and maintain the robot in an upright state to a powered state in which the legs 60, 61, 62 are stowed and the robot 5 is required to dynamically balance itself (sometimes referred to as "taking off").

The robot 5 may carry a variety of output devices or tools 74 depending upon the intended function of the robot 5. For example, an output display and speaker (not shown) may be provided so that the robot 5 can communicate questions and answers. Arms having grippers at the distal ends (not shown) or other types of tools may be provided so that the robot can perform specialized or generalized tasks, depending on the tools provided. A wireless interface 76 may also be provided so that commands, programming, instructions, and other information can be input to or output from the robot 5.

Completing the description of FIG. 1, a battery 78 provides power to the various motors, sensors, and other components of robot 5 that require electrical power. A power conditioning circuit 80 and a battery charger 82 may be provided.

Figure 2B:
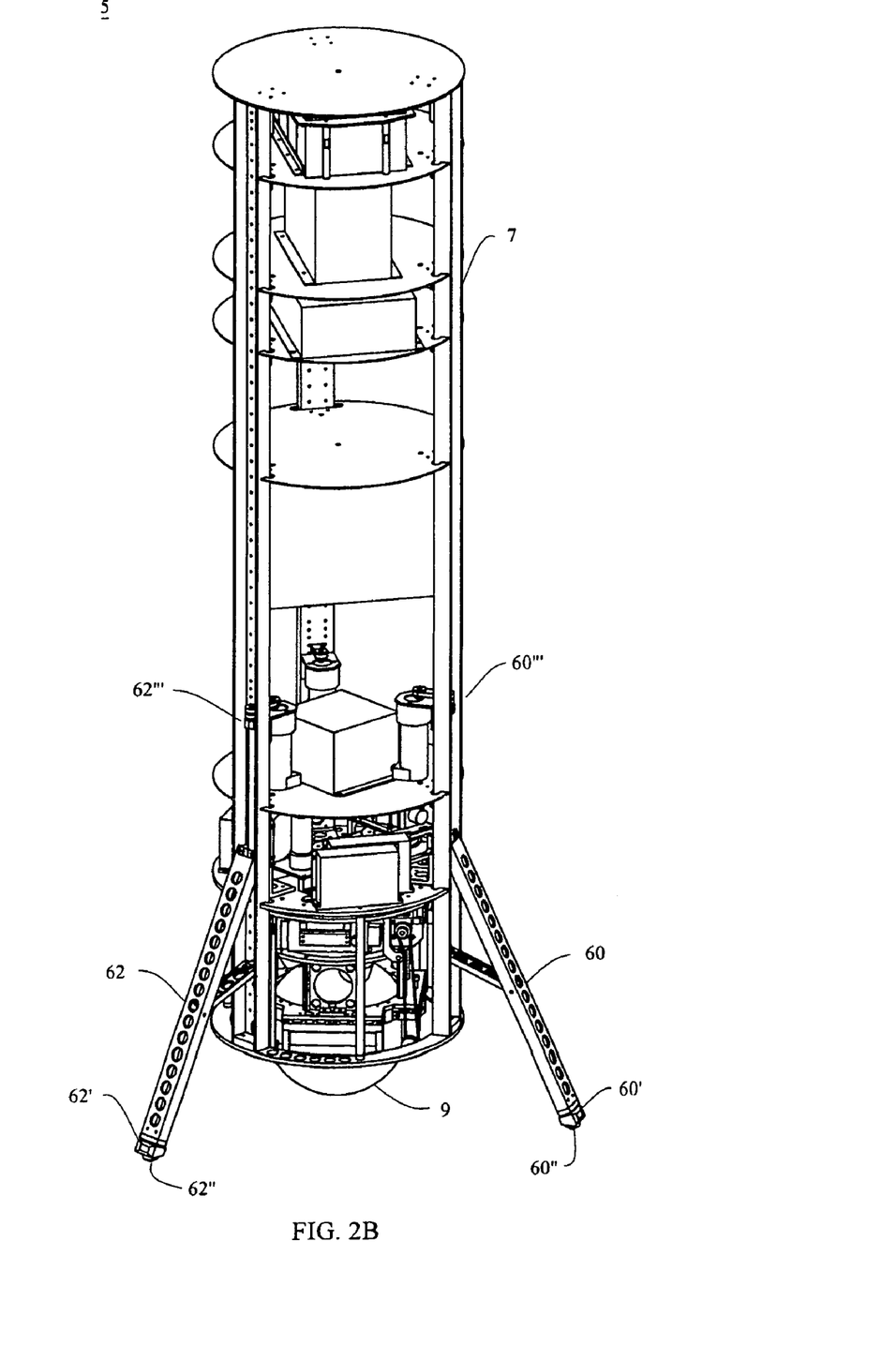

Turning now to FIGS. 2A and 2B, an example of an implementation of the block diagram of FIG. 1 is illustrated. The particular non-limiting implementation shown in FIGS. 2A and 2B is a reconfigurable research platform developed and constructed to validate the concept of a dynamically stable robot 5 comprising a platform 7 resting atop a single, spherical drive wheel 9. The robot 5 was designed to meet two goals: approximate the dimensions of a human being, and create a platform that is easily reconfigured for various present and future research efforts. The platform is a cylinder 1.5 m tall, with a diameter of 400 mm and a weight of 45 kg. Thus, the robot has a height-to-width ratio of about 3.75. Average height in the United States is approximately 1.6 m to 1.8 m and shoulder width is approximately 400 to 500 mm. depending on age, ethnicity, and gender. It is believed that height-to-width ratios in the range of from about 3.2 to 4.5 will provide an adequate approximation of an average-size adult human.

The resulting robot is tall and thin compared to statically stable robots which tend to be short and wide. Another differentiator is the center of gravity. In the robot 5, the center of gravity is approximately 815 mm off the ground. Because the robot 5 is dynamically stable, the location of the center of gravity is not as critical for stability as it is for statically stable robots which need a low center of gravity.

Three aluminum channels 84A, 84B, 84C held together by a plurality of circular decks 85, define the structure of platform 7. The three retractable landing legs 60, 61, 62 are attached to the lower third of the platform 7, which when deployed allow the robot 5 to remain upright after being powered down. At the end of each of the three legs is a wheel or ball bearing 60", 61" (not shown) and 62" (seen best in FIG. 2B). Also at the end of each leg is a contact switch 60', 61' (shown in FIG. 1) and 62' (seen best in FIG. 2B). The wheels 60", 61", 62" enable the robot 5 to roll in the event that the robot 5 is traveling at the time of a landing. The contact switches 60', 61', 62' indicate when a sufficient contact is made with the ground. Another set of limit switches 60''', 61''' (not shown), and 62''' (seen best in FIG. 2) may be provided to indicate and/or confirm that the legs 60, 61, 62, respectively, are returned to their stowed positions.

The active components illustrated in FIG. 1 are mounted on the plurality of decks 85 allowing these components to be placed at varying positions along the robot's vertical axis thereby impacting the robot's center of gravity. For example, beginning at the top of the robot in FIG. 2A, and working our way down, we see the batteries 78, programmable controller 12, battery charger 82, inertial measuring unit 14, and leg motors 64, 65, 66. Also visible in FIG. 2A is a structural support 87. The bottom portion of the platform 7 carries a drive unit 88 which is described in detail in conjunction with FIGS. 3A and 3B.

The robot 5 is designed to be entirely self-contained. Power is supplied by a 48V lead acid battery 78 with an operating time of several hours, and computing is performed onboard by a 200 MHz Pentium processor 12. Communication with the robot 5 may be through an 802.11b wireless link 76 (shown in FIG. 1). A commercially available Crossbow Technology VG700CA-200 Inertial Measuring Unit (IMU) 14 emulating a vertical gyro provides Kalman-filtered pitch and roll angles and rates with respect to gravity and a yaw rate.

As is known in the art, the inertial measuring unit 14 uses three fiber-optic gyroscopes mounted orthogonally to one another. These gyroscopes contain no rotating masses. Each gyroscope features a light source, a detector and a coil of optical fiber. Light waves travel around the coil in opposite direction and interfere with one another at the detector. During operation the three gyroscopic, angular-motion sensors move in various directions, but the light waves inside them travel at a fixed speed regardless of any movement. Accordingly, a small path difference between the clockwise and counter-clockwise propagating waves results in each sensor. The path difference causes the interference fringes at the detector to shift, producing an output that is proportional to angular velocity.

The inertial measuring unit 14 incorporates three microelectromechanical accelerometers, set orthogonally in the same box along side the gyroscopes. As the robot 5 moves, these sensors report the resulting instantaneous acceleration values for each orientation, which the programmable controller 12 then combines to yield an overall acceleration direction and magnitude that can be averaged over time.

The three fiber-optic gyroscopes and the three micro-electromechanical accelerometers sense movement of the robot 5 as disclosed in "One is Enough!" (Tom Lauwers, George Kantor and Ralph Hollis; The Robotics Institute, Carnegie Mellon University, Pittsburgh, Pa., USA; 12$^{th}$ International Symposium on Robotics Research, San Francisco, Oct. 12-15, 2005); "A Dynamically Stable Single-Wheeled Mobile Robot with Inverse Mouse-Ball Drive" (T. B. Lauwers, G. A. Kantor, R. L. Hollis; The Robotics Institute, Carnegie Mellon University, Pittsburgh, Pa., USA; Proceedings of the IEEE International Conference on Robotics and Automation, Orlando, Fla., May 15-19, 2006); and "Ballbots" (Ralph Hollis; Scientific American, Volume 295, No. 4, pages 72-77, October 2006), all of which are hereby incorporated by reference in their entireties for all purposes. The output of the inertial measuring unit 14 is used by the programmable controller 12, along with the outputs from the shaft encoders 30, 32, 34, 36 to generate the control signals 40, 42, 44, 46 (see FIG. 1) that control the motive forces applied to the spherical wheel 9 at the base of the robot 5 to create motion along a prescribed path or maintain the robot stationary and vertical (i.e., station keeping).

As an alternative to the above description of sensing the vertical, systems that use acoustic or optical sensors to calculate the range from the robot to the ground can be used to sense deviation from the vertical perpendicular to a horizontal plane. However, such systems would require that the robot 5 be confined to flat and level surfaces as they would not provide enough information to keep the robot 5 stable on an incline or uneven surface.

Figure 3A:
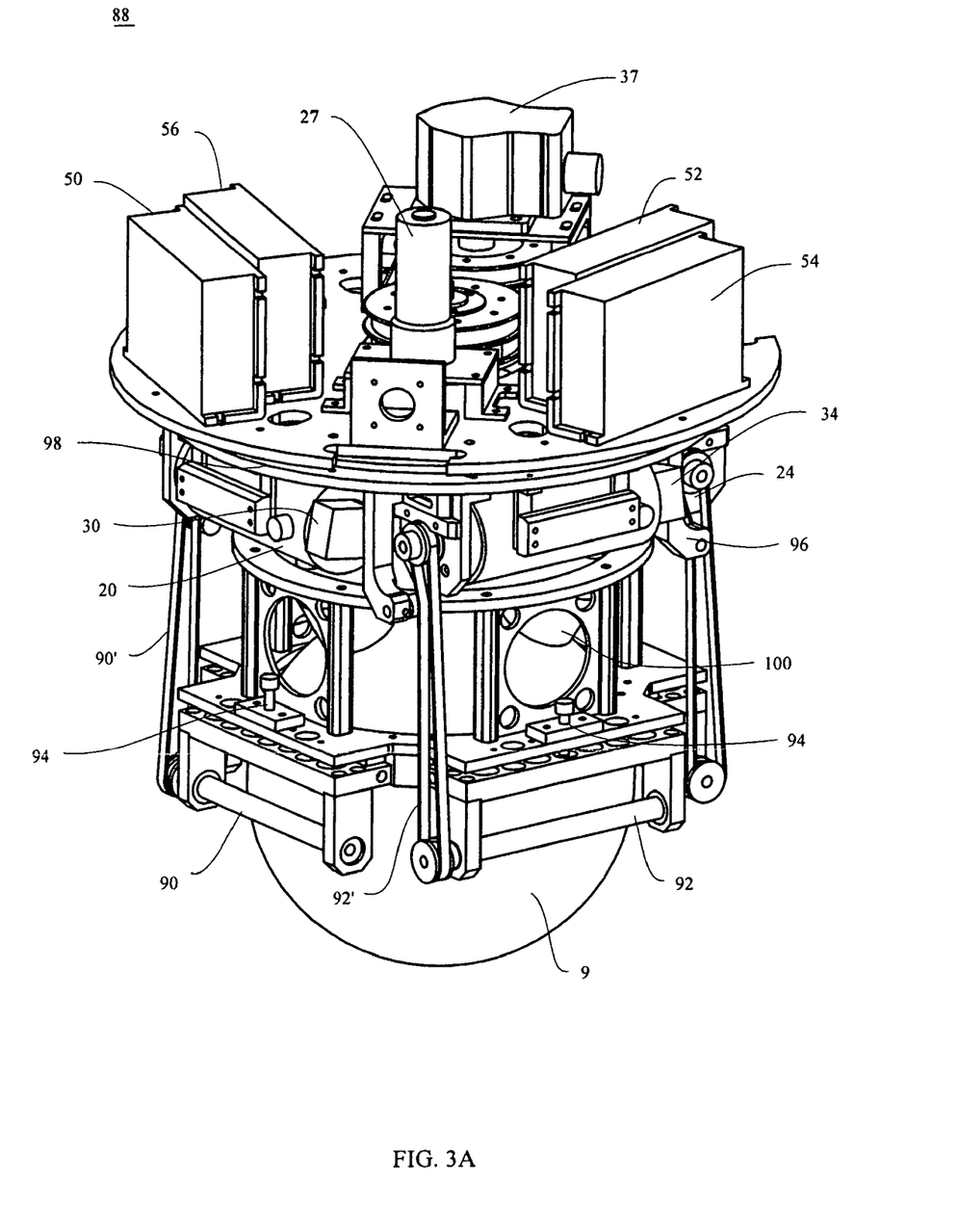
FIG. 3A illustrates a close-up of the details of the drive mechanism for the robot of FIGS. 2A and 2B.
Figure 3B:
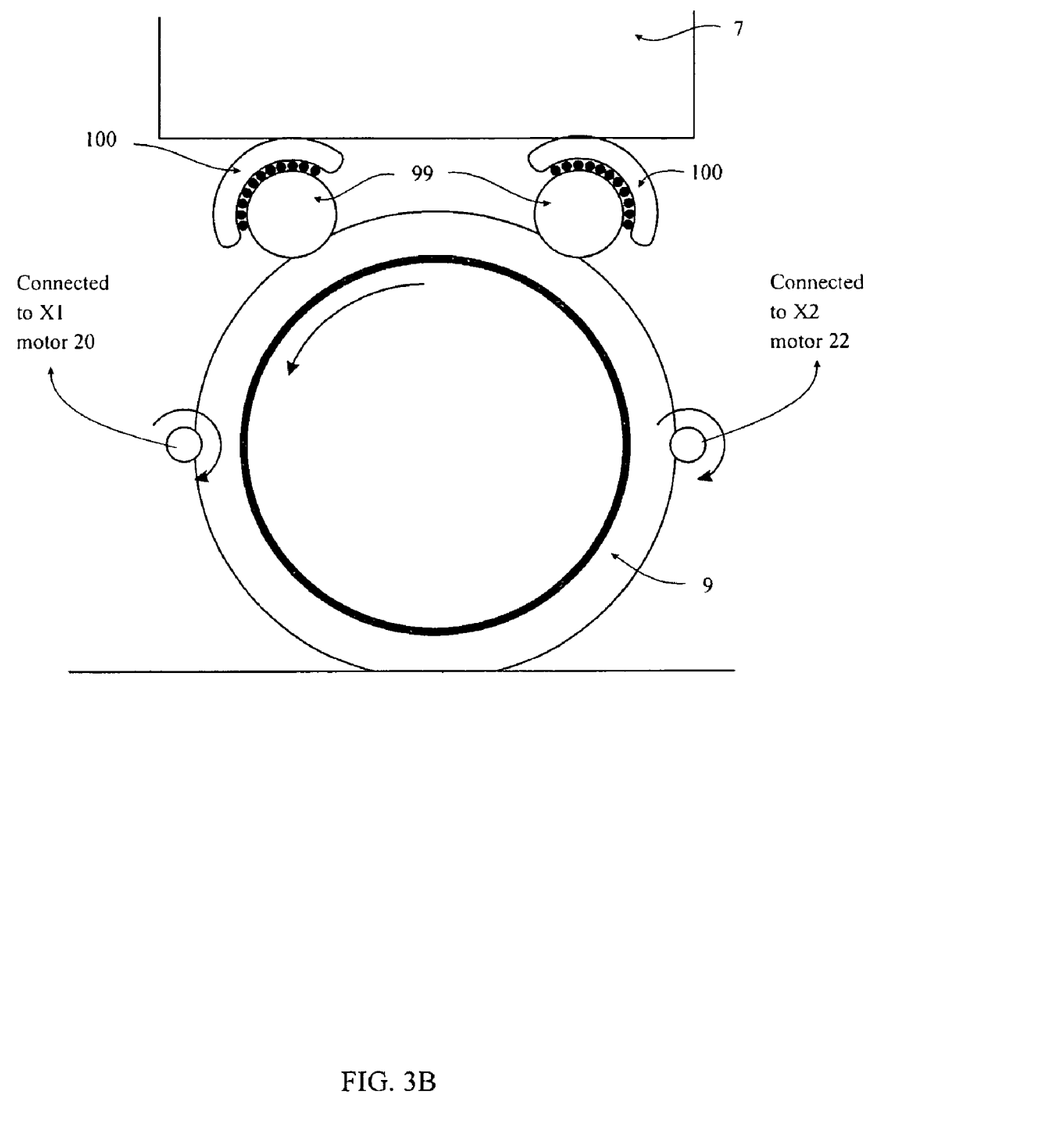
FIG. 3B illustrates certain of the contact points with the spherical wheel.

The drive mechanism 88 is shown in detail in FIGS. 3A and 3B. The drive mechanism is essentially the inverse of a mouse-ball drive: instead of the mouse ball driving the mouse rollers to provide computer input, rollers drive the sphere 9 to produce motion. The sphere 9 is a 200 mm diameter hydroformed or spun metal (steel or aluminum) shell, i.e., a hollow metal sphere, covered with a urethane or rubber outer layer. We have fabricated balls with urethane formulations of several different durometers. In our current embodiment, we use a layer of urethane that is one-half inch thick (12.7 mm) and has a hardness of shore 70 durometers.

The sphere 9 is actuated by two pairs of 12.7 mm diameter, smooth, stainless steel rollers placed orthogonally to one another at the sphere's equator. One of rollers 90, 92 from each of the pairs of rollers is visible in FIG. 3A. The other roller (unseen in FIG. 3A) in each of the pairs of rollers is located diametrically opposite of the visible roller (see FIG. 3B). Each of the rollers 90, 92 is linked through a timing belt 90', 92' to a high torque DC servomotor 20, 24. Each of the other rollers (unseen in FIG. 3A) in the pair of rollers is similarly connected to a high torque DC servomotor 22, 26 though timing belts. Each of the rollers may be provided with a pressure adjuster to enable the pressure exerted on the spherical wheel 9 to be adjusted. Each of the timing belts may be provided with a drive belt tension adjustment as is known in the art. In this manner, X1 motor 20 provides a downward force on one side of the spherical wheel 9 while X2 motor 22 provides an upward force on the opposite side of the spherical wheel 9 which combine to impart a torque on the spherical wheel 9 as seen best in FIG. 3B. Y1 motor 24 and Y2 motor 26 are similarly driven but the rollers responsive to the Y motors are positioned orthogonally with respect to the rollers for the X motors as seen best in FIG. 3A. In that manner, motion in any combination of the x and y directions is implemented.

The drive motors 20, 22, 24, 26 are connected to Copley Model 412 PWM amplifiers 50, 52, 54, 56, with 1024 cpr encoders 30, 32, 34, 36, respectively, feeding motor shaft position back to the programmable controller 12. Those of ordinary skill in the art will appreciate that the rollers and timing belts form a means for coupling a force developed by the motors to the spherical wheel 9. Other means may be used. For example, the timing belt may be replaced by a chain, one or more gears, or any other suitable means.

In another embodiment, only two drive rollers are used. Opposite the drive rollers are two spring-loaded passive idler rollers that apply force at the sphere's equator to maintain contact between the drive rollers and the sphere. In this embodiment, a pair of 1024 cpr encoders are placed on the passive rollers to measure sphere rotation.

Both arrangements (two- and four-drive rollers) represent a compromise because some slippage is always present. For example, if one roller is being driven, the orthogonal roller must be slipping. This simultaneously demands both a high-friction and low-friction material for the ball. On the other hand, it is always desirable to have high friction between the ball and the floor. As shown in FIG. 3B, the urethane covering is sufficiently pliable to allow for deformation of the surface when the surface comes in contact with, for example, a roller or the ground.

The entire drive mechanism is attached to the platform 7 with a large diameter thrust bearing 98 that allows the yaw motor 27 to re-orient the platform of the robot 5 in yaw. Finally, the entire platform 7 rests on top of the sphere 9 via three commercial low-friction, omni-directional steel spheres 99 in conjunction with recirculating ball bearings 100, two of which are seen in FIG. 3B.

In general, to maintain the robot 5 upright while stationary, the programmable controller 12 keeps the robot's center of gravity directly over its center of support. The output signals 40, 42, 44, 46 control the motors 20, 22, 24, 26, respectively, to turn the rollers that rotate the spherical wheel 9 thus causing the robot 5 to travel in the xy plane. The rollers actuating on the spherical wheel 9 initiate motion in the roll and pitch axes. The motor 27 is capable or orienting the platform in yaw, i.e., in azimuth, with respect to an arbitrary starting direction. For example, a vision sensor may receive images of a hallway from which an arbitrary line parallel to the hallway is selected as a starting line. Any azimuthal rotation of the platform with respect to the selected line will be considered the yaw angle.

To move the robot, the relative locations of the center of gravity and center of support are adjusted by motion of the spherical wheel 9 to cause a momentary imbalance manifested as the tipping of the tall platform of the robot. The gyroscopic sensors determine the direction of gravity (the vertical), which the programmable controller 12 then compares with its current attitude. During movement, the robot 5 manipulates its center of gravity to best effect to achieve a specified goal such as moving from one location to another.

To go from one point to another on level ground, the spherical wheel 9 first rotates slightly in the direction opposite to the intended direction of travel, which tilts the platform forward a bit to initiate the move. Next the spherical wheel 9 spins in the direction of motion to accelerate. While the robot 5 is at constant velocity, the platform 7 remains nearly vertical. The opposite actions occur to decelerate the robot 5 and then prepare it to halt, which together bring it to a stop. When traversing inclines, the platform must lean into slopes to maintain equilibrium.

Figure 4:
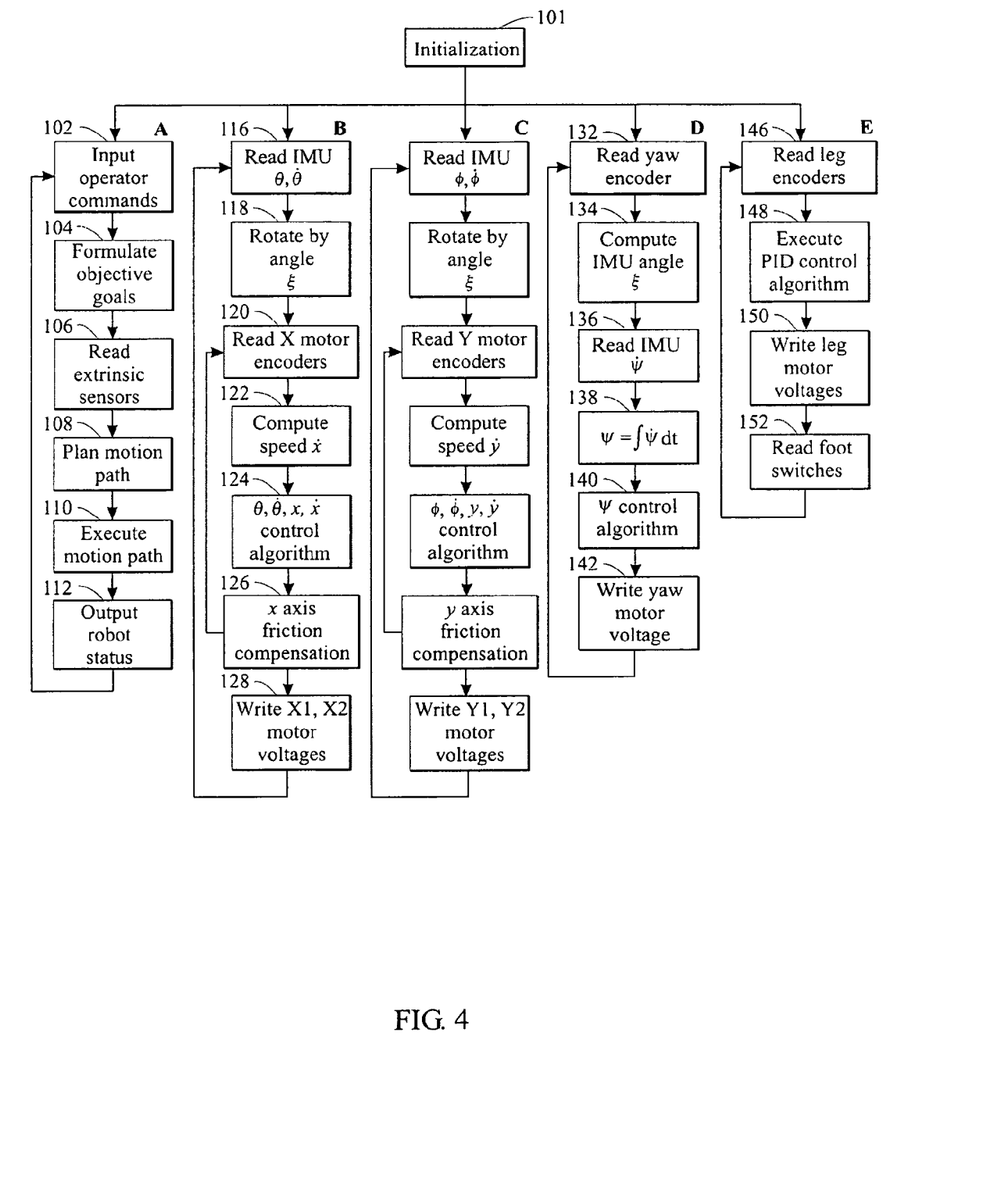
FIG. 4 is a block diagram illustrating the steps performed by the programmable controller of FIG. 1 in operating the robot of FIGS. 2A and 2B.

The operation of the programmable controller is illustrated in FIG. 4. FIG. 4 illustrates five channels of execution. These channels of execution can be performed in five separate processors, one after another in a loop in a single processor, five execution threads running in a real-time operating system, or some combination thereof. Each of the channels is responsible for a different activity such that one or more of the channels may be executing at any given time. The reader should note that the order of the steps in each of the channels is not critical. For example, the order in which data is read is not of significance.

Turning first to channel A, channel A is referred to as the executive channel. This is the channel responsible for reading user commands and writing robot status back to the user over the wireless link. The channel may be comprised, after initialization at 101, of the following steps or processes: receiving operator commands at 102, which may be input via the wireless link. At 104, objectives or goals are formulated. At 106, various sensors are read, both intrinsic and extrinsic, if available. Based on the objective and the sensor data, a motion path is planned at 108. The motion is then executed at 110, and the robot status output at 112.

Channel B performs all the work necessary to control the pitch, pitch rate, x position, and speed along the floor in the x direction of the robot. In a similar manner, channel C performs all of the work necessary to control the robot's roll, roll rate, y position, and speed along the floor in the y direction. Note that channels B and C are independent. Any affects on channel B due to the operation of channel C are treated by channel B as disturbances and are rejected by its controller (and vice versa). Channel D is responsible for handling the yaw angle of the robot. This requires measuring the angle $\xi$ between the X and Y drive axes and the inertial measuring unit's pitch and roll axes, respectively. This angle $\xi$ is used by channels B and C. Finally, channel E handles the raising and lowering of the three legs 60, 61, and 62 during takeoffs and landings.

Figure 5:
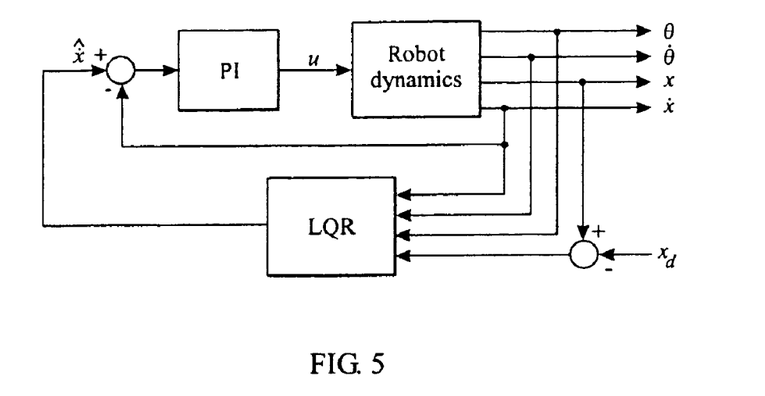
FIG. 5 is a block diagram of a structure for a stabilizing linear feedback controller.

Turning now specifically to channel B, the first step is to read the inertial measuring unit 14 to obtain the pitch and pitch rate. If there is a difference between the pitch axis of the internal measuring unit 14 and the axes of the drive rollers for X1 motor 20 and X2 motor 22, that angle must be compensated for at 118. At 120, shaft encoders 30 and 32 are read. At 122, the speed in the x direction is computed. At 124, a control algorithm is performed which determines the value for the control signals 40 and 42 needed to achieve the desired speed. The control algorithm is shown in FIG. 5. If the control algorithm does not compensate for friction, that is compensated for at 126. Finally, in 128, the output signals 40 and 42 are produced.

Channel C works substantially the same as channel B except when the inertial measuring unit 14 is read, roll and roll rate data are obtained and the parameters managed are roll, roll rate, y position, and speed along the floor in the y direction. Otherwise, the process is the same. Note that Channel C incorporates its own control algorithm as shown in FIG. 5.

Turning now to channel D, the yaw encoder 37 is read at 132. The angle ξ is computed at step 134. At step 136, the yaw rate $\dot{\psi}$ is read from the inertial measuring unit 14. Thereafter, the equation shown at 136 is solved, and using the solution, a control algorithm is run at 140 to determine the value for the output signal 47. The value for the output 47 is output at step 142.

Turning now to channel E, if the legs, 61, 62 need to be stowed or deployed, the process in channel E is performed. At 146, the leg encoders (not shown) are read. At 148, a proportional, integral, derivative (PID) algorithm is executed and the leg motor voltages are written at 150. The limit switches 60', 61', 62' are read at 152 to determine when the legs have reached their final position. One set of limit switches (60', 61', 62') may be used to indicate when a leg has make contact with the ground and another set (60''', 61''', 62''') may be used to indicate when a leg has returned to its stowed position.

The control algorithm used by channels B and C to stabilize the robot 5 is shown in FIG. 5 and has two loops: an inner loop having a proportional, integral (PI) controller, and an outer loop having a linear quadratic regulator (LQR) that uses full-state feedback. The PI and LQR controllers are just examples of algorithms that can be used. Other suitable control algorithms may be used as is known in the art.

The robot 5 has natural dynamics which cause the sensor outputs to change. As mentioned, θ is the platform pitch angle, $\dot{\theta}$ is the rate of change of the pitch angle, x is the position of the spherical wheel along the floor, and $\dot{x}$ is the robot's speed along the floor. Note that all four of these variables relate to motion in the x-z plane, where z is "up."

In FIG. 5, a command $x_d$, which is a desired position of the robot (which can be a function of time), may be input on the right hand side. $x_d$ can be zero, in which case the robot dynamically "stands" in one place. $x_d$ modifies the x robot position to bias the LQR into attempting to move the robot to $x_d$.

Each of the quantities θ, $\dot{\theta}$, x, and $\dot{x}$ are fed into the LQR which combines them into a single quantity $\hat{x}$, which is the optimal x spherical wheel speed along the floor which satisfies all the objectives, particularly, staying upright. On the left side, the actual measured speed $\dot{x}$ is subtracted from $\hat{x}$, and the result is a speed error which is fed to the PI controller.

The PI controller outputs a "control effort" u (voltages to the motor amps) which is proportional to the speed error plus the integral over time of the speed error. If the spherical wheel doesn't budge, this integral rapidly builds up enough effort to overcome the inherent static friction in the inverse mouse ball drive mechanism 88 causing the robot to move, which affects its dynamic state, and the loop keeps repeating at a rate of several hundred hertz.

This diagram in FIG. 5 is for Channel B. For Channel C, motion in the y-z plane, φ is substituted for θ, and y is substituted for x. Otherwise, operation is the same.

A number of tests were conducted to characterize physical system performance, and to make comparisons with a simulation. During operation on a hard-tiled floor, it was found that the robot was able to balance robustly, strongly resisting attempts to tip it over when a person applied torques to the platform. When operated on a carpeted surface, the robot was more easily able to do both, presumably due to the extra damping afforded by the carpet material.

Figure 6A:
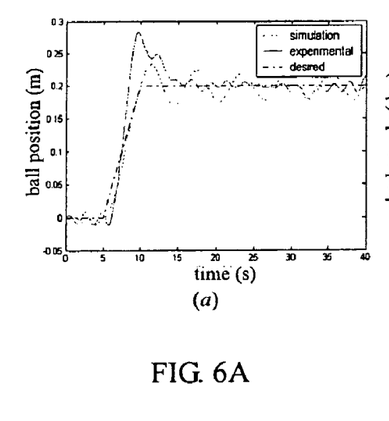
FIGS. 6A and 6B illustrate the result of a test in which the robot moved between two locations in a straight line, (A) ball position in meters, (B) platform angle in degrees.
Figure 6B:
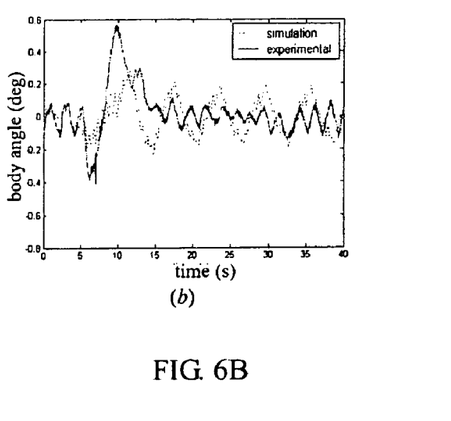

In the test run shown in FIGS. 6A and 6B, the robot was commanded to move from a starting position in a straight line to a goal position. There is an initial retrograde motion of the spherical wheel causing the platform to lean toward the goal position, followed by a reverse motion to stop at the goal. As mentioned previously, differences between simulation and experiment might derive from unknown frictional and spring forces. The divergence when station keeping is at most about 40 mm in position, and 0.5 degrees in tilt.

Figure 7A:
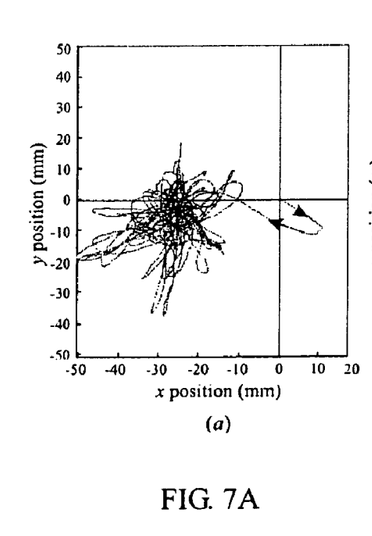
FIG. 7A is a plot of wheel path during balancing and station keeping.
Figure 7B:
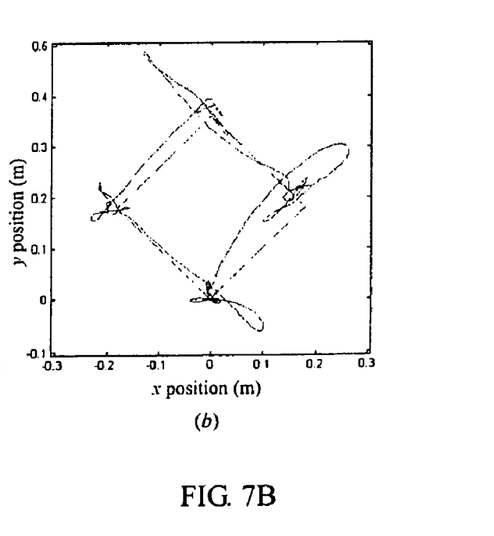
FIG. 7B is a plot of wheel path as the robot was attempting to move in a square.

To see the typical motion jitter experienced during operation, one may plot the paths taken as the ball moves around on the carpeted floor. FIG. 7A shows data taken from a 99 s run where the robot was released slightly out of balance, which was rapidly corrected by wheel motion, followed by station keeping within a roughly circular region of about 40 mm diameter. FIG. 7B shows the robot's attempt to track a square trajectory.

It is envisioned that the robot disclosed herein may be used to provide guidance and assistance in public spaces, help with education and entertainment, perform domestic cleaning and housekeeping, or fetch and carry everyday objects.

While the present invention has been described in conjunction with preferred embodiments, those of ordinary skill in the art will recognize that many modifications and variations are possible. The present invention is intended to be limited only by the following claims and not the foregoing description.

What is claimed is:

1. A dynamic balancing mobile robot, comprising:
   a single spherical wheel;
   a platform positioned above and resting on said wheel such that said single wheel is the sole contact point between said platform and the ground and the sole support for said platform, said platform configured such that said mobile robot has a height-to-width ratio approximating an average adult human, said platform carrying:
   a sensor;
   a motor;
   means for coupling a torque generated by said motor to said wheel;
   a control system responsive to said sensor for controlling the torque provided by said motor to said wheel; and
   a power supply for supplying power to said robot.

2. The robot of claim 1 wherein said wheel comprises a rubber-coated metal ball.

3. The robot of claim 1 wherein said wheel is comprised of a urethane-coated, hollow, aluminum sphere.

4. The robot of claim 1 wherein said sensor comprises a sensor for providing pitch and roll angles and rates.

5. The robot of claim 1 additionally comprising a plurality of motors positioned above said wheel, and a plurality of means for coupling, each for coupling a torque generated by one of said plurality of motors to said wheel.

6. The robot of claim 5 wherein each of said means for coupling comprises a roller in contact with said wheel and a belt connecting said roller to a motor.

7. The robot of claim 6 wherein rollers are positioned to operate in pairs located opposite one another on said wheel.

8. The robot of claim 1 wherein said control system comprises an inner control loop for controlling wheel velocity and an outer control loop for controlling stability of the robot.

9. The robot of claim 1 additionally comprising a plurality of legs carried by said platform and means for automatically moving said legs between a deployed position for supporting said platform when said platform is un-powered, and a stowed position when said platform is powered.

10. A dynamic balancing mobile robot, comprising:
    a single spherical wheel;
    a platform positioned above and resting on said wheel such that said single wheel is the sole contact point between said platform and the ground and the sole support for said platform, said platform carrying:

a plurality of motors;

means for coupling torques generated by said motors to said wheel;

a plurality of gyroscopic sensors and accelerometers for providing pitch, pitch rate, roll, roll rate, and yaw rate data;

a control system responsive to said plurality of sensors for generating signals for controlling the torques developed by said plurality of motors, said control system implementing an inner control loop for controlling wheel velocity and an outer control loop for controlling stability of the robot; and a power supply for supplying power to said robot.

11. The robot of claim 10 additionally comprising a plurality of shaft encoders each responsive to one of said plurality of motors for producing shaft position information, said control system further responsive to said shaft position information.

12. The robot of claim 10 additionally comprising extrinsic sensors for producing information about said robot's environment, said control system further responsive to said extrinsic sensors.

13. The robot of claim 10 additionally comprising a yaw motor and an absolute shaft encoder responsive to said yaw motor, said control system responsive to said absolute shaft encoder for generating signals for controlling a torque developed by said yaw motor.

14. The robot of claim 10 wherein said plurality of motors is positioned above said wheel, and wherein each of said means for coupling comprises a roller in contact with said wheel and a belt connecting said roller to a motor.

15. The robot of claim 14 wherein rollers are positioned to operate in pairs located opposite one another on said wheel.

16. The robot of claim 10 additionally comprising a plurality of legs carried by said platform and means for automatically moving said legs between a deployed position for supporting said platform when said platform is un-powered, and a stowed position when said platform is powered.

17. A dynamic balancing mobile robot, comprising:

a single spherical wheel;

a platform positioned above and resting on said wheel such that said single wheel is the sole contact point between said platform and the ground, said platform carrying:

a plurality of motors;

means for coupling forces generated by said plurality of motors to said wheel;

a plurality of sensors;

a control system responsive to said plurality of sensors for controlling the forces provided by said motors to said wheel;

a plurality of legs, said legs being moveable between a stowed position and a deployed position;

means for moving said plurality of legs, said means for moving being responsive to said control system; and a power supply for supplying power to said robot.

18. The robot of claim 17 additionally comprising a wheel on the end of each of said plurality of legs for contacting the ground.

19. The robot of claim 17 additionally comprising a switch on the end of each of said plurality of legs for indicating contact with the ground.

20. The robot of claim 19 additionally comprising a plurality of limit switches for indicating that said legs are in the stowed position.

21. A dynamic balancing mobile robot, comprising:

a single spherical wheel;

a platform positioned above and resting on said wheel such that said single wheel is the sole contact point between said platform and the ground, said platform configured such that said mobile robot has a height-to-width ratio approximating an average adult human, said platform carrying:

a sensor;

a plurality of motors positioned above said wheel;

a plurality of means for coupling, each for coupling a force generated by one of said motors to said wheel, wherein each of said means for coupling comprises a roller in contact with said wheel and a belt connecting said roller to one of said plurality of motors;

means for coupling a torque generated by said motor to said wheel;

a control system responsive to said sensor for controlling the torque provided by said motor to said wheel; and a power supply for supplying power to said robot.

22. The robot of claim 21 wherein rollers are positioned to operate in pairs located opposite one another on said wheel.

23. A dynamic balancing mobile robot, comprising:

a single spherical wheel;

a platform positioned above and resting on said wheel such that said single wheel is the sole contact point between said platform and the ground, said platform configured such that said mobile robot has a height-to-width ratio approximating an average adult human, said platform carrying:

a sensor;

a motor;

means for coupling a torque generated by said motor to said wheel;

a control system responsive to said sensor for controlling the torque provided by said motor to said wheel;

a plurality of legs carried by said platform and means for automatically moving said legs between a deployed position for supporting said platform when said platform is un-powered, and a stowed position when said platform is powered; and a power supply for supplying power to said robot.

24. A dynamic balancing mobile robot, comprising:

a single spherical wheel;

a platform positioned above and resting on said wheel such that said single wheel is the sole contact point between said platform and the ground, said platform carrying:

a plurality of motors;

means for coupling forces generated by said motors to said wheel, said plurality of motors is positioned above said wheel, and wherein each of said means for coupling comprises a roller in contact with said wheel and a belt connecting said roller to a motor;

a plurality of gyroscopic sensors and accelerometers for providing pitch, pitch rate, roll, roll rate, and yaw rate data;

a control system responsive to said plurality of sensors for generating signals for controlling the forces developed by said plurality of motors, said control system implementing an inner control loop for controlling wheel velocity and an outer control loop for controlling stability of the robot; and a power supply for supplying power to said robot.

25. The robot of claim 24 wherein rollers are positioned to operate in pairs located opposite one another on said wheel.

26. A dynamic balancing mobile robot, comprising:
a single spherical wheel;
a platform positioned above and resting on said wheel such that said single wheel is the sole contact point between said platform and the ground, said platform carrying:
a plurality of motors;
means for coupling forces generated by said motors to said wheel;
a plurality of gyroscopic sensors and accelerometers for providing pitch, pitch rate, roll, roll rate, and yaw rate data;
a control system responsive to said plurality of sensors for generating signals for controlling the forces developed by said plurality of motors, said control system implementing an inner control loop for controlling wheel velocity and an outer control loop for controlling stability of the robot;
a plurality of legs carried by said platform and means for automatically moving said legs between a deployed position for supporting said platform when said platform is un-powered, and a stowed position when said platform is powered; and
a power supply for supplying power to said robot.

* * * * *

UNITED STATES PATENT AND TRADEMARK OFFICE
CERTIFICATE OF CORRECTION

| | | |
|---|---|---|
| PATENT NO. | : 7,847,504 B2 | Page 1 of 1 |
| APPLICATION NO. | : 11/973685 | |
| DATED | : December 7, 2010 | |
| INVENTOR(S) | : Ralph L. Hollis | |

It is certified that error appears in the above-identified patent and that said Letters Patent is hereby corrected as shown below:

Column 2, Line 16, delete "or and/or" and substitute therefore -- and/or --.

Column 3, Line 67, delete "in they direction" and substitute therefore -- in the y direction --.

Column 5, Line 38, delete "to roil in the event" and substitute therefore -- to roll in the event --.

Column 8, Line 67, delete "floor in they" and substitute therefore -- floor in the y --.

Column 9, Line 18, delete "has make contact" and substitute therefore -- has made contact --.

Signed and Sealed this
Fifteenth Day of February, 2011

David J. Kappos
*Director of the United States Patent and Trademark Office*